UNITED STATES PATENT OFFICE.

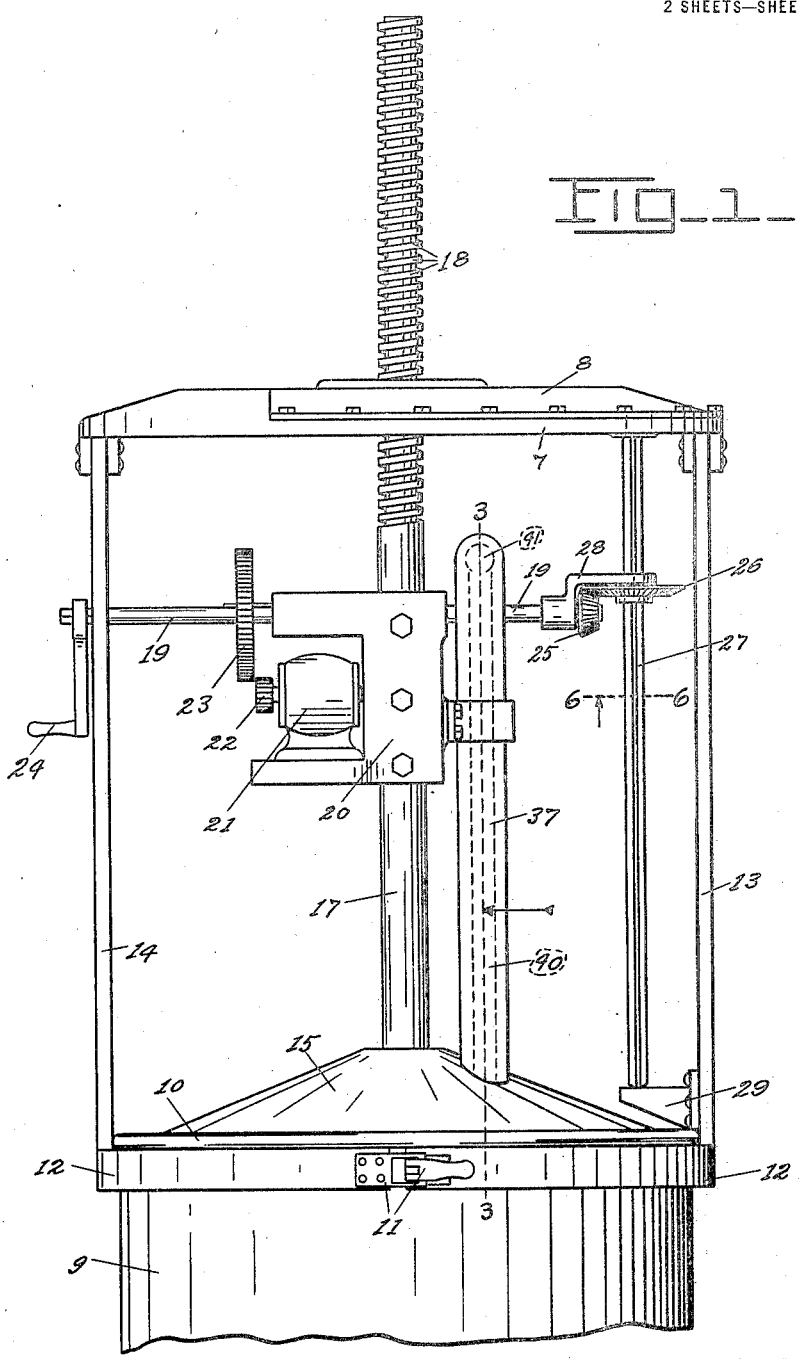

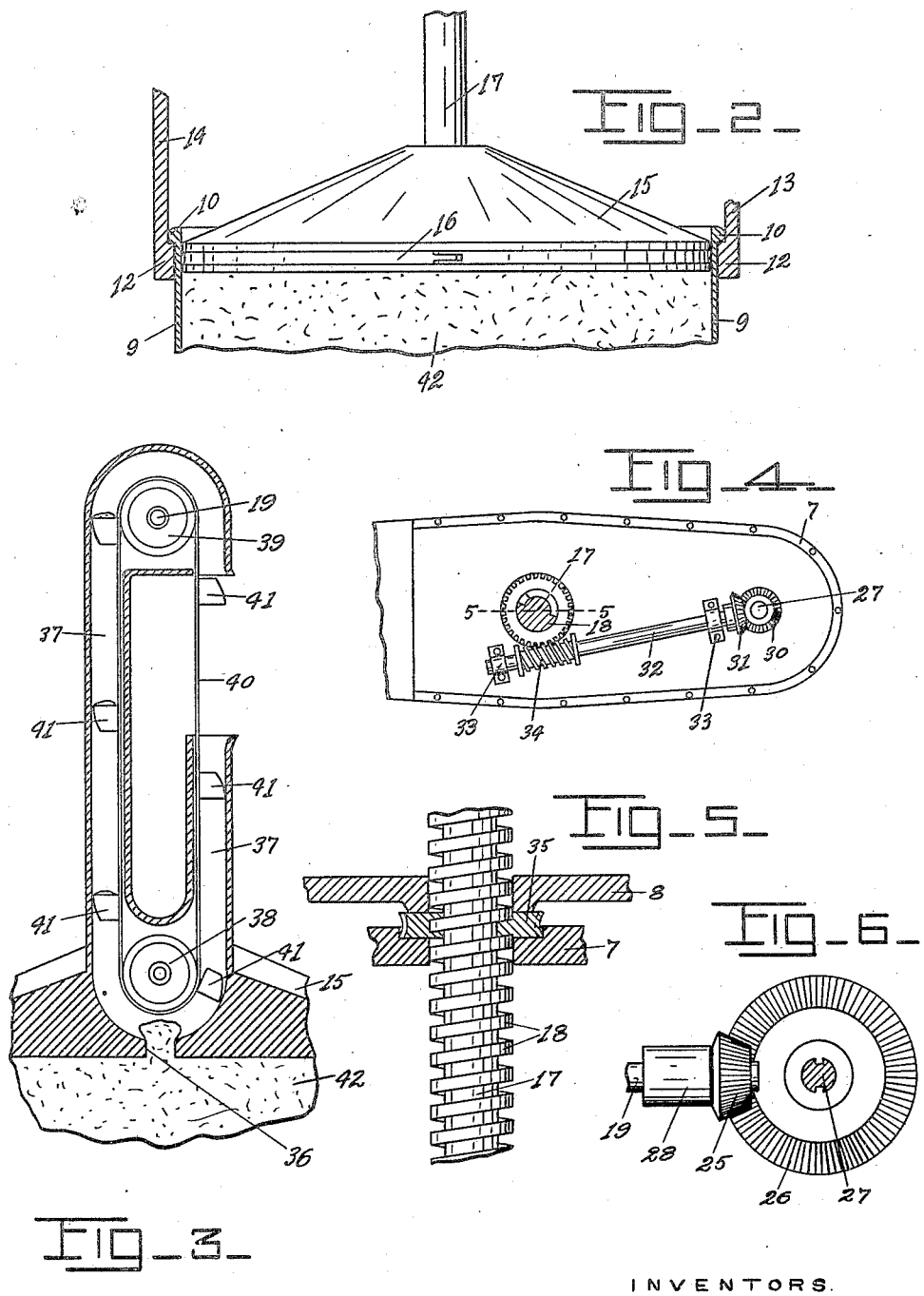

RICHARD H. GARDINER AND HARRY C. STACEY, OF MINNEAPOLIS, MINNESOTA.

ICE-CREAM-DISPENSING MACHINE.

1,358,631.  Specification of Letters Patent.  Patented Nov. 9, 1920.

Application filed May 3, 1920.  Serial No. 378,714.

*To all whom it may concern:*

Be it known that we, RICHARD H. GARDINER and HARRY C. STACEY, citizens of the United States, residing at Minneapolis, in the county of Hennepin and State of Minnesota, have invented certain new and useful Improvements in Ice-Cream-Dispensing Machines, of which the following is a specification.

Our invention relates to ice cream dispensing machines and the object is to provide means for extracting ice cream from the ordinary cream can or containers and deliver the same in convenient small equal quantities for filling dishes or pastry cones. The invention is clearly illustrated in the accompanying drawings, in which;

Figure 1 is a side elevation of the complete machine shown as secured in place on an ice cream can.

Fig. 2 is a detail view of the plunger, showing a portion of the can and other parts of the machine in section.

Fig. 3 is a detail sectional view substantially on the line 3—3 in Fig. 1.

Fig. 4 is a detail top view of a portion of the casing 7, with the cover 8 removed.

Fig. 5 is an enlarged detail sectional view on the line 5—5 in Fig. 4.

Fig. 6 is an enlarged detail sectional view on the line 6—6 in Fig. 1.

Referring to the drawings by reference numerals 9 designates an ordinary cylindrical ice cream container having a bead 10 about the top thereof. About the can 9 is secured with a suitable hand clamp 11 a clamping ring 12, which, at opposite sides, has two uprights 13 and 14 on the top of which is secured a casing 7 having a cover 8 bolted thereto. A piston or plunger 15 is positioned and constructed to slide vertically up and down in the can 9 and is provided with a piston ring 16 which insures a tight joint between the can and the piston. The plunger is further provided with a plunger rod 17 having square threads 18 on its upper portion, said rod being slidably supported in the casing 7 and cover 8. A transverse horizontal drive shaft 19 is journaled in a casting 20, which is secured on the rod 17, and on which is positioned an electric motor 21 having a pinion 22. A gear 23 is slidably keyed on the shaft 19 so that it may be meshed with and driven by the pinion 22 when so desired. The shaft 19 is provided with a hand crank 24 at one end and at the other end is provided with a bevel pinion 25 which meshes with a bevel gear 26 which is slidably keyed to travel over the length of a vertical shaft 27. A journal member 28 is also slidable on the shaft 27 and serves to secure the pinion 25 and gear 26 in rigid relation. The lower end of the shaft 27 is centered to rotate on a bracket 29 secured to the upright 13, and has its upper end journaled in the casing 7. It is provided at its upper end with a bevel pinion 30 adapted to mesh with a second bevel pinion 31, both within the casing. A shaft 32, to one end of which is secured said pinion 31, is journaled at 33 and is provided with a worm screw 34 which meshes with and drives a floating worm gear 35. The gear 35 is held in place between the casing 7 and cover 8 (see Fig. 5), and is provided with internal threads which mesh with the teeth 18 on the shaft 17.

The plunger 15 is provided with a single aperture 36 (see Fig. 3) directly above which is constructed a delivering elevator which consists of a suitable casing 37 in which is mounted two pulleys 38 and 39, the latter being secured on the shaft 19. A belt or chain 40 is stretched over said pulleys and is provided with a number of cups 41, which carry the ice cream 42 from the aperture 36 as it is being forced therethrough.

Thus it will be seen that when the shaft 19 is rotated, either by hand or by the motor 21, the plunger will be forced slowly down upon the ice cream which will have only one means of escape, that being up through the hole 36. And as the cream is forced up equal portions will be cut off and carried up by the cups 41 on the elevator to a convenient open place in the casing 37 where the cream will be dropped into cones or dishes as desired. It is obvious that the portions of cream thus delivered may be increased or decreased in size either by varying the proportions between the gear radii or by increasing or decreasing the number of cups 41 on the belt 40.

Having now therefore fully shown and described our invention what we claim to be new and desire to protect by Letters Patent is:

1. In combination with a container, of a plunger adapted to be forced down into said container, said plunger having an aperture therein, a frame secured to said container, means in said frame for forcing said plunger slowly down into said container.

2. In combination with an ice cream container, of a plunger adapted to be forced down into said container, said plunger having an aperture therein up through which ice cream may be pressed, means for automatically delivering equal portions of cream up from said aperture as said plunger is being forced down into said container.

3. In combination with an ice cream container, of a plunger adapted to be forced down into said container, said plunger having an aperture therein up through which ice cream may be pressed, an elevator positioned over said aperture, the same being adapted to deliver said ice cream up from said aperture.

4. In combination with an ice cream container, of a plunger adapted to be forced down into said container, said plunger having an aperture therein up through which ice cream may be pressed, an elevator positioned over said aperture, the same being adapted to deliver said ice cream up from said aperture, means for simultaneously actuating said plunger and said elevator.

5. In combination with a vertical container, of a suitable frame and means for securing it to the container, a plunger adapted to be forced down into said container, said plunger having a suitable aperture therein to allow the escape of the contents of said container when said plunger is being forced down therein, a shaft on said plunger adapted to be guided by said frame.

6. In combination with a vertical container, of a frame and clamping means for securing the same to the container, a plunger adapted to be guided by said frame and to be forced down into said container, said plunger having a port through which the contents of the container may be delivered when the plunger is being forced down therein.

7. In combination with a vertical container having a bead about the top thereof, of a band adapted to be clamped about the container under said bead, a frame secured to the band, a plunger adapted to be guided by said frame and to be forced down into the container, said plunger having a port through which the contents of the container may be delivered when the plunger is being forced down therein.

8. In combination with a vertical container of a frame secured to the container, a plunger adapted to be guided by said frame and forced down into the container, said plunger having a port through which the contents of the container may be pressed when the plunger is forced down into the container, a motor supported on the plunger, and a mechanism whereby the running of said motor will force the plunger down into the container.

9. In combination with an ice cream container, of a plunger adapted to be forced down into said container, said plunger having an aperture therein up through which ice cream may be pressed, an elevator positioned over said aperture, the same being adapted to deliver said ice cream up from said aperture, a casing adapted to cover the elevator except for a portion of the downward run thereof.

In testimony whereof we affix our signatures.

RICHARD H. GARDINER.
HARRY C. STACEY.